Figure 1:
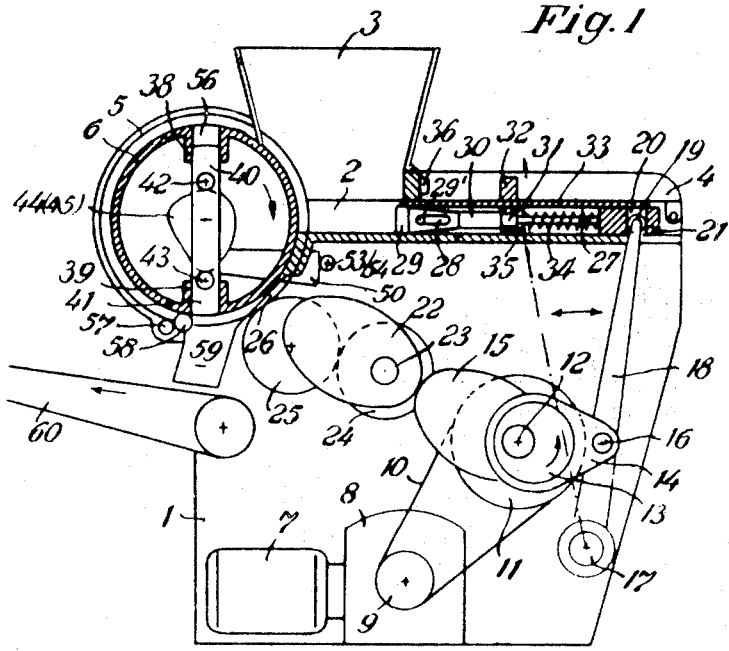

United States Patent
Neumann et al.

[15] 3,658,013
[45] *Apr. 25, 1972

[54] DOUGH-DIVIDING MACHINE

[72] Inventors: Hans Neumann, Stuttgarter Str. 5; Walter Schnee, Hebelstrabe 3, both of Villigen, Black Forest, Germany

[*] Notice: The portion of the term of this patent subsequent to Aug. 25, 1983, has been disclaimed.

[22] Filed: Apr. 15, 1963

[21] Appl. No.: 273,122

[30] Foreign Application Priority Data

June 8, 1962 Germany................W 32396 111/2b

[52] U.S. Cl............................................................425/238
[51] Int. Cl.................................................................A21c 5/04
[58] Field of Search ....................107/15.5, 15.6, 15.1, 15.2, 107/4.3, 4.2, 15, 109; 18/2.6, 30 PQ; 222/219; 74/393, 437

[56] References Cited

UNITED STATES PATENTS 2,787,972  4/1957  Vogt....................................107/15.1
2,933,940  4/1960  Hallden..................................74/437

Primary Examiner—Leon G. Machlin
Attorney—Jacob L. Kollin

[57] ABSTRACT

A dough dividing machine for small products, such as bread rolls. A dough gauging cylinder and a lost motion dough feed mechanism are operated in timed relationship. The lost motion mechanism enables precise control of the dough. The gears are so dimensioned that they reduce the speed of rotation of the gauging cylinder during the charging of the gauging compartment and increase the speed throughout the rest of the cycle.

4 Claims, 7 Drawing Figures

DOUGH-DIVIDING MACHINE

The invention relates to a dough-dividing machine intended more particularly for small products such as bread rolls. Dough-dividing machines are known in great variety, especially those in which the dough to be divided is fed from a supply hopper onto a flat bed underneath, and thence pressed, by means of a reciprocating shutter followed by a reciprocating piston into gauging spaces of a given volume and then expelled from these. Such machines have gauging compartments which can be moved perpendicularly to the bed of dough and are mounted in gauging cylinders which rotate intermittently. In order to provide correctly timed motion to the gauging compartments, shutters and pistons of the usual type of machine and somewhat complicated parts, are required, such as driving cams, which are difficult to produce.

Moreover, the motions in these machines are of a periodic nature, so that the operating speed cannot be increased beyond a certain point, the driving parts wear quickly and, in consequence, the fault incidence is high.

The purpose of the inventions is to provide a remedy for these drawbacks, by ensuring that the driving mechanism of the dough-dividing machine shall run continuously in the same direction, thus providing smoothness of movement to the dough feed mechanism, uninterrupted operation to the gauging cylinder and to the dough gauging and expulsion equipment moving inside the gauging compartments.

According to the invention, in order to achieve simply the uninterrupted operation of all such parts which play a decisive part in dividing the dough, the gauging cylinder is driven by means of a toothed rim on the cylinder itself, through intermediate gears running continuously in the same direction, while the dough feed mechanism takes its drive from an eccentric which has a lever-type strap connected to a lever arm. The dimensions of the intermediate gearing that drives the toothed rim on the gauging cylinder are such that this cylinder makes one revolution to two complete cycles of the reciprocating dough feed mechanism.

So that it may be possible to increase the working speed notwithstanding the continous rotation of the gauging cylinder, without reducing the time taken to charge the gauging compartments below the minimum that is absolutely essential if undue compressive strasses are to be avoided, a pair of elliptical gear wheels are inserted in the intermediate gear train driving the gauging cylinder. These elliptical gears are so dimensioned that they reduce the speed of rotation of the gauging cylinder during the charging of the gauging compartments and increase the speed throughout the rest of the cycle.

To ensure that the charging and discharging of the gauging compartments shall be as trouble free as all the other operations, a further important feature of the invention provides for the gauging cylinder to be fitted with radial gauging plungers, placed axially side by side. These plungers are moved radially backwards and forwards – in unison, being joined together by axial rods – by stationary cam discs which control the motion of the rods, so that the plungers form gauging compartments, and expel the portioned-out dough pieces, at each side, in turn.

The construction of a machine according to the invention requires the dough feed machine to consist of a slide coupled to the lever arm; a rod connected to the slide; a piston connected to the rod through a slotted slide or lost notion coupling; and a shutter fitted non-rigidly on the rod and driven ahead by the slide.

According to a further feature of the invention the shutter has a transversely mounted guide member which can be fitted over an extension of the rod and against which one end of a spring acts in the direction of motion of the slide, either directly or through a spring plate. The other end of said spring bears against said slide. The guide member is checked, in its directions of motion, by fixed adjustable stops, in such a position as to leave a gap open to the dough feed hopper.

This arrangement produces a rapid and yet smooth shutter action. An advantageous further feature of the invention provides for the cam discs that produce the reciprocating motion of the gauging plungers, to be secured to two spindles in line, these being mounted in stationary bearings and capable of limited rotary motion in unison. The cam discs are so shaped, that as a result of the setting obtained by the rotation of the spindles, those ends of the plungers which happen to be in the down position, employed for the expulsion of the dough pieces, are brought by the cam discs into alignment with the periphery of the gauging cylinder, whereas those ends of the plungers which divide the dough can be moved to take up various positions, according to the quantity of the dough desired at any given moment.

The design principles covered by the invention result in smooth, even running of the gauging cylinder and present the great advantage that the volume of dough measured out can be altered, while the machine is running, by appropriately changing the setting of the cam discs. This is effected by some form of manual adjustment, such as a handwheel, acting on the cam disc spindles.

Since the gauging compartments, of which there can be any desired number, are formed at the periphery of the cylinder, the invention admits of the gauging cylinder being given the form of a hollow drum having pairs of tubular openings arranged side by side along the axis of the drum and projecting inwards from diametrically opposite positions. These tubular openings, in conjunction with the plungers that slide in them, form the gauging compartments. This greatly reduces the weight of the cylinder and, consequently, the power taken. The hollow construction of the cylinder makes it possible, furthermore, for it to accomodate without difficulty any weights needs for balancing purposes.

There is a particularly simple means of keeping the gauging cylinder free from any portions of dough that tend to adhere and of detaching the dough pieces as these are expelled. This involves the use of a stripper roll which is in contact with the outer face of the gauging cylinder and so placed as to lie (in terms of the direction of rotation of the gauging cylinder) immediately after the position at which the dough pieces are expelled. This stripper roll is driven by means of an intermediate gear wheel in mesh with the toothed rim on the gauging cylinder, so as to rotate in the same direction and with the same speed variations as the gauging cylinder. Thus the outer faces of the gauging cylinder and stripper roll run in opposite directions along their line of contact.

In addition to the advantages already mentioned, a particularly attractive feature of the invention is that the gauging cylinder need accelerate only from the low speed used during charging to the higher speed used during discharging (and to slow down accordingly, vice versa), and not, as with known kinds of machines, to accelerate from zero to operating speed and to slow down from this to zero.

According to a further feature of the invention due to the continuous rotation of the cylinder in the same direction, the outer surface of the cylinder continually brings down fresh supplies of dough from the feed hopper to the table.

Finally, the machine is of simple construction and therefore easy to manufacture, set up and supervise; and because it needs, for example, only four plungers for eight charging compartments, it is easy to clean.

Figure 2:
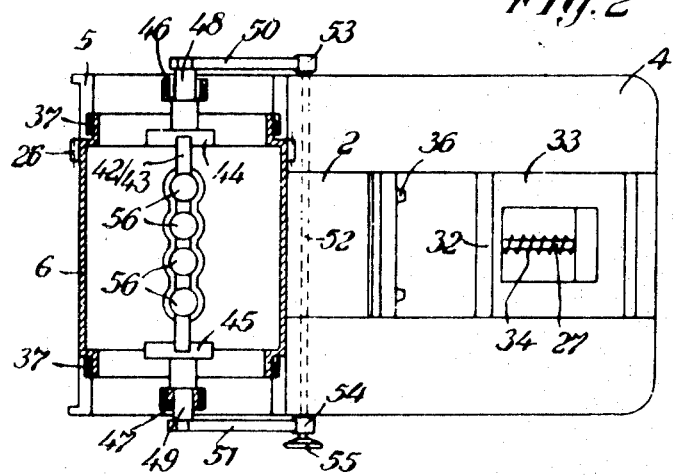

One construction of the machine according to the invention is diagrammatically illustrated by way of example in the accompanying drawings, in which, FIG. 1 is a side elevation of the machine;

FIG. 2 is a corresponding plan with the gauging cylinder in longitudinal section, and FIGS. 3 to 7 show the gauging cylinder and the dough feed arrangements in various stages of operation.

The dough-dividing machine shown in the drawings has a casing 1, which houses the drive; a top section 4, which accomodates dough table 2 and dough feed hopper 3, and a side portion 5, supporting the gauging cylinder 6. An electric motor 7, in casing 1, drives sprocket 9 through gearing 8. Chain 10 transmits the drive from sprocket 9 to another sprocket 11 on shaft 12, which shaft is mounted in casing 1 and is free to rotate. The shaft 12, known as the timing shaft, carries an eccentric 13, with lever strap 14, and an elliptical gear wheel 15.

The lever strap 14 is non-rigidly connected by pin 16 to lever 18, the fulcrum of which is spindle 17. The top end of this lever carries a roller 19, engaging in vertical slot 20 in slide 21, which can be moved across dough table 2.

Elliptical gear wheel 15 engages with a second elliptical gear wheel 22, mounted on shaft 23, which is free to turn but has no other movement. On shaft 23 is fitted gear wheel 24, the motion of which is conveyed through another gear wheel 25, to a toothed rim 26, on gauging cylinder 6.

Slide 21, which is driven forward and back, by lever 18, once for every turn of timing shaft 12, is rigidly connected to a push-rod 27, which in turn is connected by way of slotted slide coupling 28 so as to transmit motion to a piston 29, which pushes the dough across dough table 2. Push-rod 27 has a collar 30, with an extension piece 31, straddled by a transversely mounted guide member 32, which serves a cut-off shutter 33, which can be pushed longitudinally on slide 21 and piston 29.

On the right-hand end of rod 27, coil spring 34 is fitted, with one end bearing against the inner face of slide 21 and the other, through spring plate 35, pressing guide 32 against the shoulder between extension piece 31 and collar 30. When slide 21 is moved to the left, it carries shutter 33 with it, until the guide member 32 comes up against stops 36. The stops 36 can be so adjusted (though the mode of adjustment is not a shown in the drawings) as to enable the gap (a, in FIG. 4), remaining open in dough feed hopper 3 during the charging stage, to be altered as necessary.

Gauging cylinder 6, which is mounted on bearing 37 in side support 5 so as to have rotary motion only, projects into feed hopper 3 so as to close it from the side. This cylinder is in the form of a hollow drum containing four pairs of radially opposed tubular openings 38 and 39, mounted side by side and projecting inwards, with plungers the ends of which, 40 and 41, move radially inside the tubular openings. Plungers 40 and 41 are interconnected by means of axial rods 42 and 43, both ends of which extend outside drum 6, and follow the curves on opposite sides of two identical cam discs 44 and 45. The cam discs 44 and 45 mounted respectively on spindles 48 and 49, which have limited rotary motion, in the stationary bearings 46 and carry toothed segments 50 and 51 at their outer ends. The teeth on segments 50 and 51 engage with two pinions 53 and 54, secured on stationary transverse shaft 52. With the aid of handwheel 55 on shaft 52, spindle 48 and 49 (and hence also cam discs 44 and 45) can be rotated in the same direction and through the same angle.

The two cam discs 44 and 45 are curved semicircularly round spindles 48 and 49 so that in all positions of rotation they always bring rods 42 and 43 down, as drum 6 rotates, into the same position, in which the plungers 40 and 41 connected to the rods are aligned with the periphery of the drum. In other respects cam discs 44 and 45 are so shaped that as the drum rotates they act through rods 42 and 43 to withdraw plungers 40 and 41 axially inwards, to an extent determined by the adjustment of handwheel 55 and so as to form gauging compartments 56. Handwheel 55 can be operated while the machine is working, so that the depth of gauging compartments 56 and hence the amount of dough to be portioned out, can be changed in the course of running.

Toothed rim 26 of gauging cylinder 6, which rotates in a clockwise direction, engages with an intermediate gear wheel 57 mounted below rim 26 so as to have rotary motion only, and this in turn causes stripper roll 58, in contact with gauging cylinder 6 to rotate clockwise. The dough pieces ejected at the bottom by plungers 40 and 41 from gauging compartments 56 are cleanly detached by stripper roll 58 and passed through spout 59 to endless conveyer belt 60, below the spout.

The mechanism hereinbefore described operates as follows:

Through the interpolation of elliptical gear wheels 15 and 22, gauging cylinder 6 is driven alternately at increasing and decreasing speeds during the charging of gauging compartments 56, the speed is reduced, then it increases until these compartments are emptied, after which it falls again and so on. As the diametrically opposite gauging compartments are brought into play alternately, gauging cylinder 6 must be alternately speeded up and slowed down while turning through an angle of 180° each time.

Thus cylinder 6 rotates at its maximum speed when in the position shown in FIG. 1. After passing through this position it slows down until the upper gauging compartments, 56, have passed through the position shown in FIG. 3, into the horizontal position, which is intermediate between the positions shown in FIGS. 4 and 5. From that moment the speed increases again until the charged gauging compartments 56 reach the bottom or discharging position, and the gauging compartments on the opposite side reach the top position, as in FIG. 1. The whole sequence is then repeated.

Figure 3:
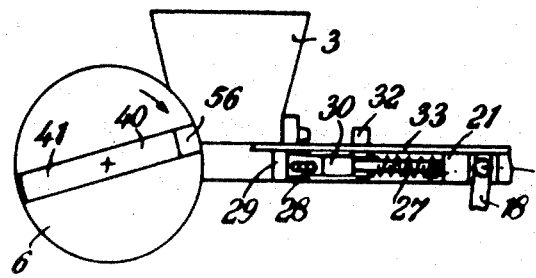

During the movements of plungers 40 and 41 and the gauging compartments 56 formed by them, corresponding movements are being carried out by the dough feed mechanism. In the position shown in FIG. 1, lever 18 assumes its extreme right hand position, so that slide 21, piston 29 and shutter 33 are in their starting positions, on the right. The rotation of the timing shaft produced by the section of motor 7 operates eccentric 13 and lever strap 14 and so causes lever 18 first to pivot gradually counter-clockwise into its extreme left-hand position, indicated by the broken line. As seen in FIG. 3, shutter 33 is thus first carried to the left, while piston 29 remains in its original position for the time being. As gauging compartments 56 steadily approach dough feed hopper 3 and are finally moved into it (FIGS. 3 and 4), shutter 33 continues to advance, until its guide member 32 meets stops 36 and comes to a halt, leaving a narrow gap between itself and the gauging cylinder 6.

Figure 4:
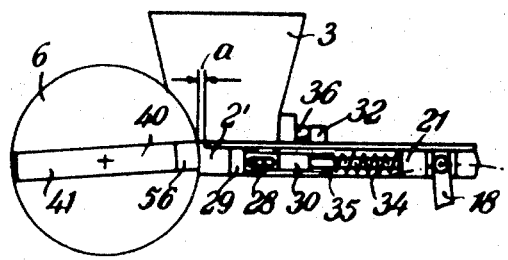
Figure 5:
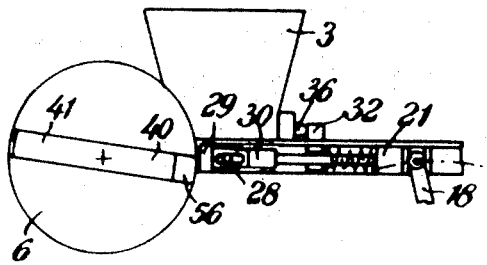
Figure 6:
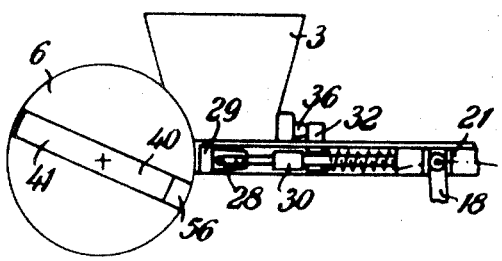
Figure 7:
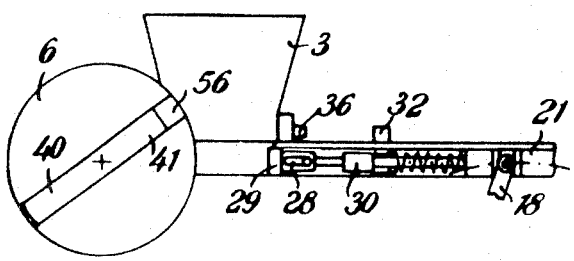

In the meantime, as in FIG. 4, piston 29 has been carried along by slide 21 and push-rod 27, by means of slotted slide coupling 28, and has started pushing the dough that had reached the dough table from feed hopper 3 leftward into gaugint compartments 56. While gauging compartments 56 are passing by at reduced speed, piston 29 is pushed close up to the periphery of gauging cylinder 6 (FIG. 5) and now forces the dough occupying part 2 of the dough table into gauging compartments 56. Admittedly, some pressure is momentarily exerted on the dough at this time, but it is harmless and does not destroy the proving texture, because the reduction in the speed of rotation of gauging cylinder 6 during the charging stage enables the motion to be imparted to the dough on the table 2 relatively slowly and, again, because excessive compression is prevented by the presence of the adjustable gap a, through which the excess dough is able to escape.

Shortly after gauging compartments 56 are full, lever 18 swings back so that the slide 21 and push-rod 27 are moved to the right. As soon as the positions of gauging cylinder 6 and lever 18 shown in FIG. 6, have been reached, piston 29 is caught up by rod 27, by means of coupling 28, and shortly afterwards extension 31 of rod 27 meets guide member 32 of shutter 33, so that the shutter, too, is carried back to its starting position as in FIGS. 7 and 1. The position shown in FIG. 7 differs from that in FIG. 1 in that while slide 21, piston 29 and shutter 33 have reverted to the same position the gauging cylinder has merely turned through 180° and plunger ends 40 and 41 have now changed places.

While the mechanism that has served to charge gauging compartments 56 with dough is returning to its original position, the forces of adhesion of gauging cylinder 6, as it projects into feed hopper 3, are able to bring from hopper 3 under its own weight and by virtue of the suction created by the retreating piston 29, down onto table 2, so that the gauging compartments now brought into position can be filled.

We claim:

1. A dough-dividing machine for small goods, such as bread rolls, comprising, in combination, a machine frame, a dough table mounted on said frame adjacent one end of said table, a dough feed hopper mounted on said frame above said dough table, a dough-gauging cylinder rotatably mounted on said frame, adjacent said hopper, said cylinder being provided with a toothed rim, lost motion dough feed means mounted on said table for pressing dough into said gauging cyclinder, said lost motion dough feed comprising a slide displaceable on said dough table in the direction of said hopper, a push rod secured with one end to said slide, the other end of said push rod being provided with a guide pin, a slotted coupling slidably mounted on the other end of said push rod, and guided by said pin, a piston secured to said coupling, for pushing dough across said table, a collar slidably mounted on said rod and provided with an extension piece straddled by a transversely mounted guide member, a cut-off shutter slidable on said slide and said piston and served by said guide member, a coil spring fitted on said rod and bearing with one end against said slide and with its other end against said collar, said slide carrying said shutter therewith, and a pair of stops secured to said hopper for limiting the movement of said guide member and said slide, drive means for continuously driving said cylinder and said lost motion dough feed means in timed relationship, said drive means including means for reducing the speed of rotation of the gauging cylinder during the charging period thereof and increasing the speed of said cylinder during the remaining period of said cylinder's rotation, said drive means including a main drive shaft, a gear train operably connecting said main shaft and said toothed rim, an eccentric mounted on said main shaft, a lever having one end pivotable on said machine frame and its other end pivoted to said slide, a lever strap slidably mounted on said eccentric and pivotably secured to said lever intermediate the lever ends, said gear train comprising a pair of elliptical gears, said gear being dimensioned for reducing the speed of the gauging cylinder during the charge of the gauging compartments and increasing the speed of said cylinder throughout the rest of the rotational period of said cylinder.

2. A machine according to claim 1, wherein said gauging cylinder is provided with a plurality of radially disposed, diametrically opposed tubular openings, a plurality of plungers slidable in said openings, cam means for reciprocating said plungers in said tubular openings, said cam means being operable in timed relationship with said gear train to retract said plungers for receiving dough portions fed by said dough feed means and to expel said portions at a predetermined station, during the rotation of said gauging cylinder.

3. A machine according to claim 2, wherein said cam means comprise a pair of cam discs, a pair of spindles secured to said discs, bearing means for said spindles and a pair of axially extending rods connecting said plungers, said rods engaging with said cam discs for reciprocating said plungers.

4. A machine according to claim 3, further comprising a spout for for guiding discharged dough portions, a stripper roll contacting the outer face of said gauging cylinder said stripper roll being mounted aft of said spout relative to the direction of rotation of said gauging cylinder and gear means, operable by said cylinder, for rotating said stripper roll.

* * * * *